United States Patent [19]

Tomecek

[11] 4,132,284

[45] Jan. 2, 1979

[54] ELECTRONIC CRUISE CONTROL

[76] Inventor: Jerry J. Tomecek, 29830 Beck Rd., Wixom, Mich. 48096

[21] Appl. No.: 770,685

[22] Filed: Feb. 22, 1977

[51] Int. Cl.² .............................................. B60K 31/00
[52] U.S. Cl. ................................ 180/105 E; 123/102; 180/109
[58] Field of Search ............... 180/105 R, 105 E, 108, 180/109; 74/513; 318/281; 123/97, 98, 102

[56] References Cited

U.S. PATENT DOCUMENTS

| | | | |
|---|---|---|---|
| 3,090,460 | 5/1963 | Teetor | 180/105 |
| 3,332,406 | 7/1967 | Perry | 180/105 E X |
| 3,476,205 | 11/1969 | Kato | 180/105 R |
| 3,612,017 | 10/1971 | Ishizaki | 123/102 |
| 3,648,798 | 3/1972 | Jania | 180/105 E |
| 3,946,707 | 3/1976 | Gray | 123/102 |
| 3,983,767 | 10/1976 | Lefevre | 74/513 |
| 4,036,323 | 7/1977 | Schmall | 180/105 R |
| 4,056,157 | 11/1977 | Kawata | 180/105 E |
| 4,058,094 | 11/1977 | Moore | 123/102 |

Primary Examiner—Joseph F. Peters, Jr.
Assistant Examiner—Terrance L. Siemens
Attorney, Agent, or Firm—Krass & Young

[57] ABSTRACT

A system for adjusting and maintaining cruising speed for automobiles employs electronic circuitry connected to the engine ignition system for generating a voltage proportional to engine speed. A manually actuated switch allows the vehicle operator to choose a cruising speed by storing the speed related signal in a memory. A comparator then receives the stored signal and the instantaneous speed signal and generates an error signal to control a bi-directional drive connected to the vehicle accelerator pedal through a tension member. A solenoid actuated clutch in the drive system for the tension member is energized when the operator sets the cruising speed and is deenergized when the vehicle is braked, when the engine speed falls below a predetermined value, or when the engine ignition or the speed control are turned off. Operator controlled switches allow the vehicle speed to be gradually increased or decreased until a desired speed is attained and the signal for that speed stored in the control, and another switch allows the operator to temporarily accelerate or decelerate the vehicle and then resume a previously stored speed.

15 Claims, 5 Drawing Figures

ELECTRONIC CRUISE CONTROL

BACKGROUND OF THE INVENTION

1. Field of the Invention

This invention relates to a system adapted to be connected to the electrical system and the accelerator pedal of a conventional vehicle to allow the operator to set and maintain a desired cruising speed without the need for modifying the accelerator position as power demands on the engine vary.

2. Prior Art

A variety of devices have been developed to relieve the driver of an automobile or other vehicle of the need to constantly use the vehicle's accelerator pedal to maintain a desired cruising speed for the vehicle. These devices minimize driver fatigue on long trips, eliminate the possibility of the driver unconsciously exceeding legal speed limits and improve the fuel economy of the vehicle by minimizing fuel wasting accelerations.

One class of such automatic engine control devices is adapted to be factory installed in the vehicle during the vehicle manufacture process and involves fluid or electro-mechanical control mechanisms connected to the engine to sense the engine speed and to modify the engine throttle setting to maintain the speed at a level sensed by the operator. These devices are quite complicated and they are accordingly expensive and somewhat unreliable in their operation. Because of their complexity it is extremely expensive to install this type of speed control system on an existing vehicle. One form of such system is disclosed in U.S. Pat. No. 3,476,204.

The expense in installing these complicated speed regulating systems on an existing vehicle and the high cost of the systems even when factory installed led to the development of a simplified form of control which allowed the vehicle operator to automatically achieve a predetermined throttle setting rather than a predetermined engine speed. The operator would control the engine speed through use of the accelerator pedal until the desired speed was attained and then engage the control to maintain the throttle setting attained at that time. While the vehicle speed would change on a hilly road, during level driving conditions this form of control maintained a relatively constant vehicle speed. A device of this type is disclosed in McMaKen U.S. Pat. No. 3,204,734. The device disclosed in that patent may be easily adapted to an existing vehicle as it employs only a single mechanical connection to the vehicle accelerator pedal and simple connections to the vehicle electric system.

Another form of cruise control has been marketed which employs a voltage derived from the engine ignition system as an indication of the vehicle speed and uses this to control the accelerator position and maintain that speed. In this system the operator controls the vehicle speed through the accelerator pedal until a desired speed is reached. He then turns a potentiometer to a setting which generates a voltage equal to the speed relaed voltage generated by the system at that instant. This adjustment process is relatively complex as the operator must sense increases or decreases in vehicle speed to determine when the potentiometer setting equals the speed related voltage. The speed related voltage in this system is developed by a circuit which integrates a series of variable frequency, variable amplitude, constant width pulses. This arrangement depends for its accuracy upon the constant nature of the ignition pulses. If breaker points deteriorate this voltage changes and accordingly the speed control drifts.

SUMMARY OF THE INVENTION

The cruise control system of the present invention broadly comprises an electronic circuit connected to the vehicle electric system and equipped with operator input controls, adapted to exercise control over the position of the vehicle accelerator pedal. Broadly, the circuit derives an electrical signal having a voltage proportional to the instantaneous engine speed by a method which is generally independent of the amplitude of the ignition pulses and the operator controls allow any instantaneous value of this signal to be stored without the necessity of any adjustment by the operator. A comparator receives the stored signal representative of the desired engine speed, and the instantaneous engine speed signal and develops an error signal used to control a bi-directional electric motor. The motor turns a drum to draw in or extend a flexible cable having its other end connected to the accelerator pedal. The cable can pull the accelerator down or release it to allow motion toward a lower speed position under the regular spring bias of the pedal. A drive motor is connected to the drum through gearing which may be shifted between an engaged and disengaged condition by an electrically actuated solenoid. This shift mechanism acts as a clutch and alternative forms of clutches may be employed in alternative embodiments of the invention.

The solenoid is energized to engage the gearing when the operator sets a desired speed level into the control memory by actuating a switch when the vehicle is moving at the desired speed. Thereafter the system increases or decreases the accelerator pedal position and in turn the engine throttle setting in response to output signals from the comparator indicating that the vehicle is moving above or below the set speed. The solenoid is deenergized when the operator brakes the vehicle, when the vehicle speed falls below a predetermined level or when either the cruise control or the vehicle ignition are shut off.

The operator may increase or decrease the stored speed value to a desired level without using the accelerator through a switch which causes the circuitry to generate control signals that adjust the accelerator control position until the desired speed is reached. The switch is then released and automatically sets the desired speed into the control memory. Another switch allows the operator to accelerate or decelerate the vehicle for a period and then to resume a preset speed by isolating the memory circuit from the balance of the system while the operator controls the vehicle speed.

With the exception of the accelerator drive mechanism the cruise control system of the present invention is fully electronic. The engine speed control signals are derived in an electronic manner from the engine ignition system pulses; the braking of the vehicle and the attainment of excessive speed are both detected electronically and all of the control signals are derived in a fully electronic manner. The electronic circuitry includes means for comparing an electrical signal representative of the instantaneous vehicle speed with the stored signal representative of the desired speed which utilizes a pair of operational amplifiers each connected in a comparator mode. One of the amplifiers compares the instantaneous speed signal with the stored signal to generate a bivalued signal that is high when the actual speed signal exceeds the stored signal and lower otherwise. The other amplifier has an output that is high when the stored speed signal exceeds the instantaneous speed signal and low otherwise. Each output triggers one of two pairs of transistors, connected as a reversing switch, into conduction and accordingly passes current through the accelerator drive motor in a direction dependent upon the comparison between actual speed and desired speed.

The compact electronic construction of the present system allows an entire unit to be housed in a small cabinet adapted to be readily secured beneath the dashboard or to the firewall of an automobile. The controls may be housed in a box attached to the dashboard or steering column so they are readily accessible to the driver. Simple installation merely comprises electrical connection between the unit and the vehicle's electrical system and the attachment of flexible cable to the accelerator.

Other objectives, advantages and applications of the invention will be made apparent by the following detailed description:

Figure 1:
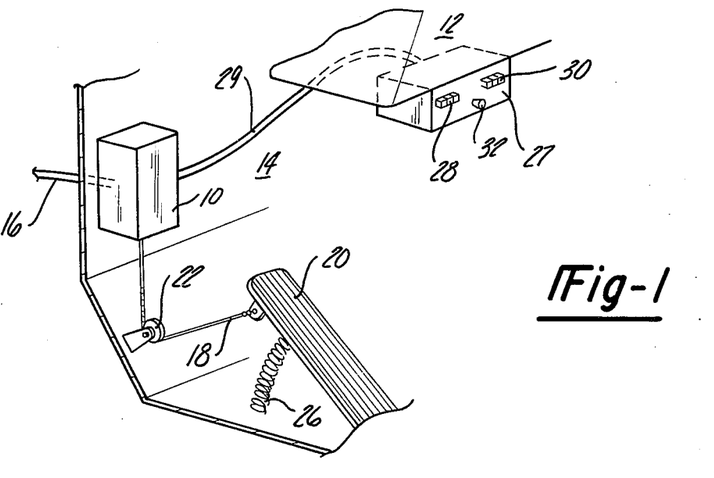
FIG. 1 is a perspective view of a portion of the firewall adjoining the floorboard area of an automobile illustrating the control system of the present invention attached to the firewall and connected to the vehicle accelerator pedal.

The preferred embodiment of the electronic cruise control is housed within a rectangular box 10 adapted to be supported in some location convenient to the driver of the vehicle such as below the vehicle dashboard 12 and forward of the firewall 14. The unit could alternatively be placed on top of the dashboard or on the steering column of the vehicle. The unit makes electrical connection with the engine and vehicle electric system through a cable of wires 16. The unit applies control to the vehicle through a flexible cable 18 which preferably takes the form of a sheet metal ball chain. One end of the chain is connected to the underside of the vehicle accelerator pedal 20 adjacent to its free end. The chain is preferably arrayed about a rotatable pulley 22 secured to the floorboard of the vehicle below the accelerator pedal. The pedal 20 is hingedly supported to the vehicle floor at its end 24. The free end of the pedal is biased into an upward position, away from the floorboard, by a spring 26. The accelerator arrangement is conventional.

By withdrawing the cable 18 into the unit 10, the control pivots the accelerator pedal 20 downwardly against the bias imposed on the rod 26 to increase the throttle opening of the vehicle and to cause the engine to speed up. When the cable 18 is released the accelerator pedal 20 can pivot upwardly under the bias imposed on the rod 26. The vehicle operator can always depress the accelerator pedal to increase the throttle opening and can actuate the unit 10 to release the chain 18 and allow the vehicle to slow down in a number of ways which will be subsequently described.

The operator controls for the system are supported on the front face of a control box 27 supported beneath the forward face of the dashboard 12. Alternatively, these controls might be supported on the steering column or on the box 10 itself. The controls 27 connect to the box 10 through a cable 29.

The controls consist of a pair of three positioned slide switches 28 and 30, and a push button switch 32. The three position switch 28 provides an "off" position on the extreme left, an "on" position in the center and "set" position on the right. The switch has a spring return to the center "on" position from the "set" position; that is, when the operator moves the switch from the "on" position to the "set" position it will return to "on" as soon as the operator releases the switch. When the vehicle is running and operating at a speed that the operator desires to specify as a cruising speed, the operator moves the switch from the "off" position through the "on" position to the "set" position. Upon release, the switch springs back to the "on" position. The unit will then operate to adjust the position of the accelerator pedal 20 through the cable 18, to maintain the vehicle speed that existed at the time the switch was released from the set position. The operator may alter this set speed by turning the unit to "off," or touching the brake, or by resetting the unit after another desired speed has been attained through control of the accelerator pedal. In simple embodiments of the invention a single manual control 28 is all that is required.

The control 30 allows the operator to increase or decrease the speed control setting without requiring operator actuation of the accelerator pedal 20. The switch 30 has an "up-speed" position on the left and a "down-speed" position on the right. The switch is spring returned to its center, inactive position, when released from either the right or the left position. When the switch 28 is in the "on" position and the driver wants to increase the speed setting of the control, or set an initial value in the control which is higher in speed than the existing vehicle speed, the operator moves the switch 30 to the "up-speed" position. The control then slowly pulls the cable 18 causing the accelerator pedal 20 to move downwardly causing the vehicle speed to increase. When the vehicle has attained the speed that the operator desires he releases the switch 30, which springs to the center position, and the existing speed of the vehicle is set into the control and the control then maintains that speed. Similarly, the operator can lower the existing speed setting of the control by moving the switch 30 to the "down-speed" position. The control will then slowly release the cable 18 and allow the accelerator pedal to move upwardly under its bias. When the desired lowered speed has been attained the operator releases the switch 30 which springs to the center position and the new speed is set into the control and maintained there.

The push button 32 allows the operator to cause the control to resume a previously set speed after the control has been disabled by the operator depressing the brake or by the vehicle speed falling below its minimum setting. As will be subsequently described either of these events causes the control to release the cable 18. Afterward, by momentarily depressing the button 32, the operator can cause the control to resume the previously set speed.

The control is disabled when the switch 28 is moved to the "off" position or when the vehicle ignition switch is turned off.

Figure 2:
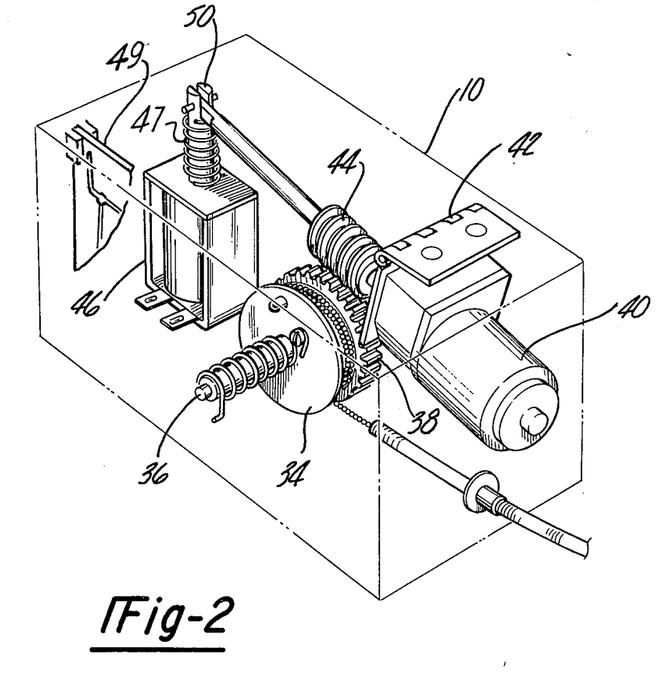
FIG. 2 is a perspective view of the control of the present invention with the box shown in phantom lines and the circuit board broken away for purposes of illustration.
Figure 3:
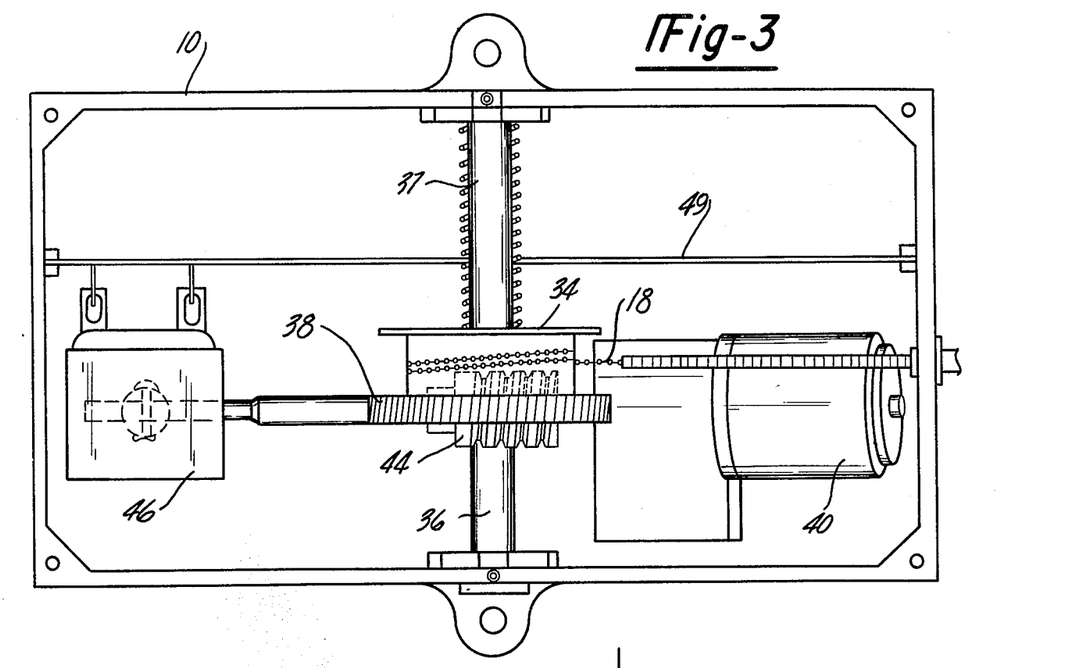
FIG. 3 is a bottom view of the control of FIG. 2.

The mechanism for controlling the position of the cable 18 is supported within the housing 10. One end of the cable is connected to the edge of a reel 34 which is on a shaft 36. A torsion spring 37 is wound about the shaft 36 and has one end connected to the shaft and the other end connected to the housing 12. The spring biases the reel toward rotation in a direction to draw in any slack in the chain 18. The shaft 36 is rotatably journeled between two opposed sidewalls of the housing 10. A pinion gear 38 is also affixed to the shaft 36 so that when the gear 38 rotates the reel 34 is turned. A fractional horsepower direct current motor 40 is pivotably supported on the base of the housing 10 by a hinge 42. The motor has a spiral gear 44 affixed to its shaft.

An electrically energized solenoid 46 is pivotably supported on the base of the housing 10 and has its shaft 50 connected to the motor 40. The shaft of the solenoid 46 is normally biased toward an extended position by a compression spring 47. When the solenoid 46 is energized the shaft 50 is retracted and causes the motor 40 to pivot about its hinge point 42 and bring the spiral gear 42 into meshed engagement with the gear 38. When the motor 40 is energized it then rotates the gear 48 and the shaft 36 causing the spool 34 to rotate. This either extends or retracts the cable 18 depending upon the direction of rotation of the motor 40. When the solenoid 46 is deenergized the drive gear 44 moves out of engagement with the gear 38 and allows the spool 34 to freely rotate under the bias of the spring 37.

Figure 4:
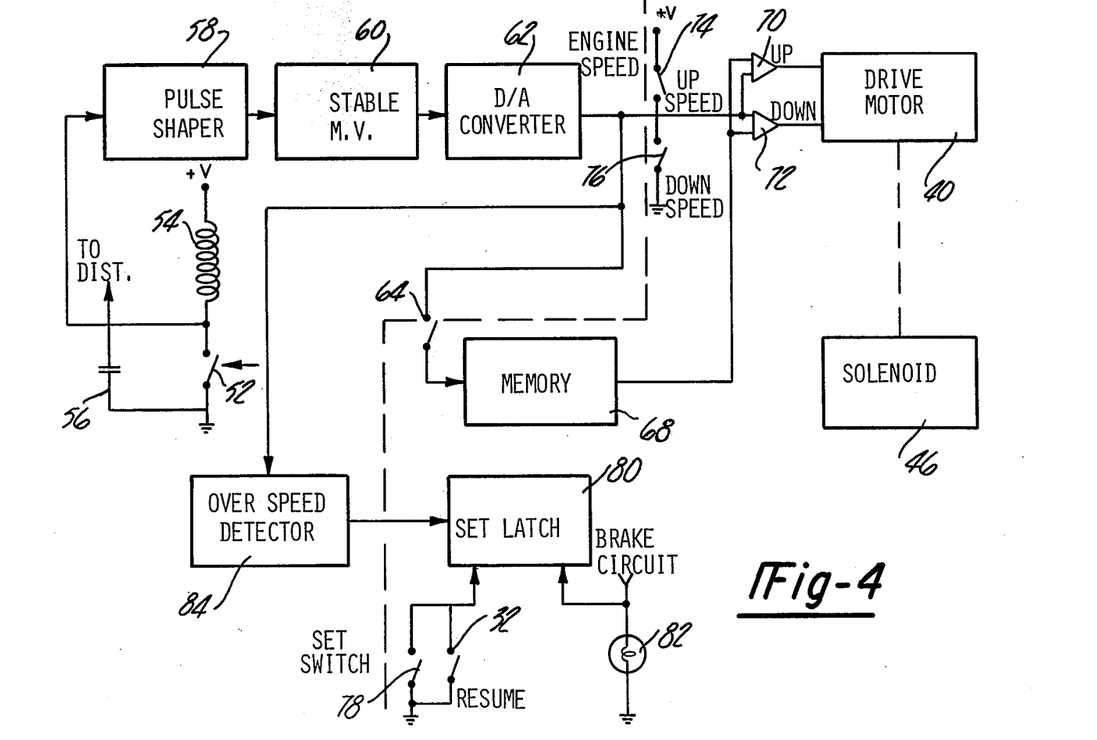
FIG. 4 is a block diagram of the electronic control system of the present invention.

FIG. 4 discloses the broad arrangement of the electronic circuitry which controls the drive motor 40 and the solenoid 46 in accordance with the engine speed and the operator controlled switches. This circuitry is formed on a printed circuit board 49 which extends across the length of the box 10 and has a center hole through which the shaft 36 and spring 37 pass.

An electrical signal proportional to the engine speed is derived from the high voltage side of the breaker points 52 of the electrical system. The breaker points are disposed in series with the secondary of the spark coil 54 across the battery terminals. A capacitor 56 shunts the breaker points to suppress sparking. The breaker points are closed periodically in timed relation to rotation of the engine.

Upon closing of the points a suddenly rising and oscillatory decaying voltage is applied to a pulse shaping circuit 58 forming part of the cruise control. The circuit 58 clips the breaker point wave form to block all voltages above 9 volts and integrates the resulting waveform and applies it to a one-shot multi-vibrator 60. Each time the multi-vibrator receives a triggering pulse it outputs a regulated voltage pulse for a predetermined period of time. Accordingly, the output of the multi-vibrator constitutes a chain of regularly shaped pulses having a frequency which is a function of engine speed.

Pulse outputs from the multi-vibrator 60 are supplied to a digital-to-analog convertor 62 which integrates the pulses to produce an electrical signal having a voltage proportional to the instantaneous engine speed. A switch 64, which forms part of the operator controlled set switch 28, applies the output voltage of the convertor 62 to a memory circuit 66. This circuit stores the voltage that is applied to it at the instant that the switch 64 is opened. In operation of the slide switch 28, this occurs when the operator releases the switch in the "set" position and it springs back to the center position.

The actual engine speed signals from the digital-to-analog convertor 62 as well as the stored speed signals from the memory 68 are applied to a pair of operational amplifier comparators 70 and 72. The amplifier 72 receives the engine speed signal as its reference input and the stored speed signal as its active input. It provides a high output whenever the stored speed exceeds the actual speed. This signal is provided to the drive motor 40 and energizes it in such a direction as to retract the cable 18 and accordingly depress the accelerator pedal 20. The operational amplifier 72 receives the stored speed signal from the memory 68 as its reference input and the actual engine speed as its active input and provides a high output signal whenever the actual engine speed exceeds the stored speed. This signal is applied to the drive motor 40 in the opposite direction to the signal to the comparator 70 and energizes the drive motor in such a direction as to release the cable 18 and accordingly allow the accelerator pedal 20 to rise, slowing the vehicle.

The gains of the amplifiers 70 and 72 are controlled by feedback resistors 71 and 73 respectively. The resistor 73 preferably has a substantially lower resistance than the resistor 71 and accordingly acceleration amplifier 72 has a lower gain than deceleration amplifier 70. Because of this lower gain, as the difference between the stored speed signal and the actual speed signal becomes small while the vehicle is accelerating under automatic control the output of the amplifier 72 decreases, gradually decreasing acceleration of the vehicle.

A switch 74 which connects the engine speed output of the convertor 62 to a positive voltage, forms part of the "up-speed" switch 30. It effectively creates a false actual speed signal which causes an output from the amplifier 70 increasing the speed of the engine. The switch 74 is ganged with the memory set switch 64 so that the memory set switch is closed while this up-speed signal is being applied. When the up-speed switch 74 is released the voltage from the converter 62 at the higher speed is set in memory.

Similarly, a switch section 76 forming part of the switch 30 applies a false voltage to the comparators 70 and 72 when it is depressed. This voltage causes a high output from the comparator 72 which causes the drive motor 40 to release the cable 18, slowing the speed of the vehicle. The switch section 76 is also ganged with the memory set switch 64 so that the new lower speed is stored in the memory 68 when the switch 76 is released.

The memory set switch 64 is also ganged with a latch set switch 78. When the operator moves switch 28 to a "set" position a voltage is applied to a latch 80 which causes it to produce a high output that energizes the solenoid 46, engaging the output of the drive motor 40 to the cable reel 34. While the latch 80 remains set the drive motor controls the position of the accelerator pedal although the operator can speed up the engine by depressing the pedal beyond the setting determined by the cruise control.

The latch 80 is released, terminating power to the solenoid 46, when the operator applies the brakes to energize the brake light 82. Afterward, although signals are applied to the drive motor 40, they do not control the cable 18 until the latch is reset. The latch may also be released by a signal from an underspeed detector 84. The detector receives the output of the converter 62 which generates a signal proportional to engine speed. When this signal falls below a reference value, such as the value at 20 or 25 miles per hour, the detector 84 opens the latch to deenergize the solenoid. This feature prevents the cruise control from being used at speeds which would cause excessive hunting of the motor.

The resume switch 32 shunts the latch set switch 78. This allows a voltage stored in the memory 68 to be used to control the engine speed after the latch has been opened by braking action.

Figure 5:
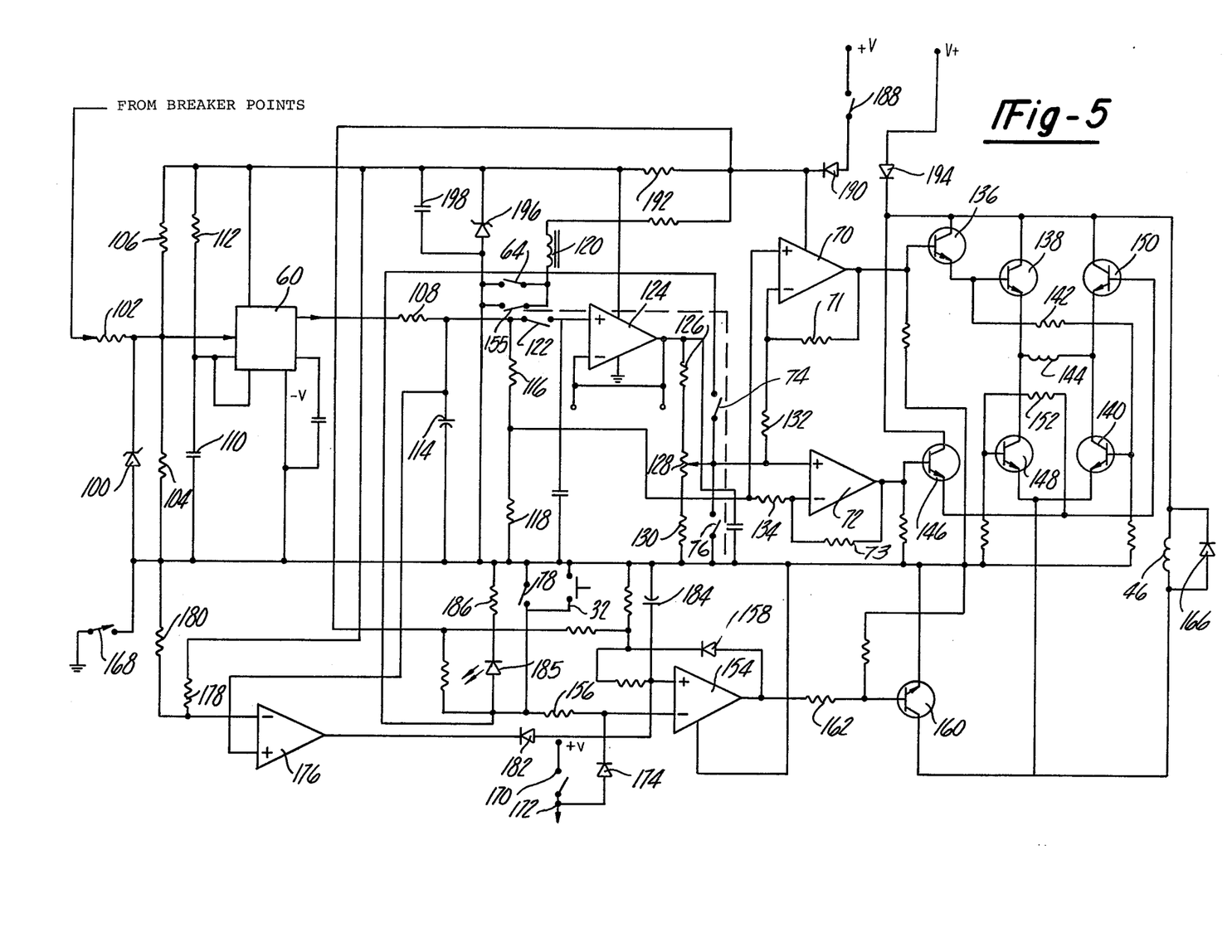
FIG. 5 is a detailed schematic diagram of the control system of the present invention.

The structure of the electronic circuitry of the cruise control is illustrated in more detail in the schematic diagram of FIG. 5. The voltage across the breaker points is applied to a Zener diode 100 through a current limiting resistor 102. The Zener shunts a resistor 104 connected in series with resistor 106 between the positive and negative terminals of the battery. The Zener diode 100 has a break-down voltage slightly lower than the peak voltage which occurs across the breaker points.

This clipped voltage is supplied to the one-shot multi-vibrator 60. When the voltage at the one-shot falls below its trigger voltage it provides an output pulse through a resistor 108 and also disconnects a shorting circuit internal to multi-vibrator 60 and connected to the capacitor 110 from ground so that the capacitor begins to charge from the positive terminal of the power supply through the resistor 112. When the voltage across the capacitor reaches a predetermined level which is preferably about two-thirds of the battery voltage, the multi-vibrator 60 switches back to its original state. The values of the capacitor 110 and the resistor 112 thus control the time constant of the multi-vibrator 60.

The resistor 108 applies the output pulses from the multi-vibrator to an integrating capacitor 114. The capacitor is shunted by a series pair of resistors 116 and 118. The capacitor 114 and the resistors 116 and 118 act to integrate the pulses provided by the multi-vibrator 60 and accordingly develop a voltage which is a function of the instantaneous frequency of the breaker point closures, or the speed of the engine.

The coil of a reed relay 120 is connected in series with the set switch 64 across the battery. Accordingly, when the switch 64 is closed the reed relay is energized and closes a set of normally opened contacts 122. These contacts apply the integrated voltage across capacitor 114 to the input of a field effect transistor (FET) operational amplifier 124. The extremely high impedance provided by this FET input avoids any significant short time deterioration of the voltage across capacitor 114 when the reed relay is closed. The output of the operational amplifier 124 is applied to the series combination of a resistor 126, a potentiometer 128 and a resistor 130. The potentiometer 128 is factory-set so that the voltage at its variable contact is equal to the voltage at the midpoint of the resistors 116 and 118. When the set switch 64 is opened, removing the voltage across the capacitor 114 from the op amp 124, the op amp stores that voltage by virtue of the bootstrap connection between its output and its negative input. It thus acts as the memory device 68 of FIG. 3 and preserves the applied voltage until the switch 122 is again closed or the power is removed from the op amp.

The voltage at the variable terminal of the potentiometer 128, representing the memory speed setting, is applied directly to the active input of the comparator op amp 72 and to the reference input of the comparator op amp 70 through a resistor 132. The voltage at the junction between resistors 116 and 118, representing the instantaneous engine speed, is applied to the reference input of operational amplifier 72 through resistor 134 and directly to the active input of the operational amplifier 70.

The output signal from the op amp 70 which goes high when the actual speed signal exceeds the stored speed is applied to an NPN transistor 136 connected as an amplifier. The emitter of this transistor is connected directly to the base of a transistor 138 and to the base of another transistor 140 through a resistor 142. Accordingly, when the output of the amplifier 70 goes high, the transistors 138 and 140 are driven into conduction. Their collector-emitter circuits are connected in series with the coil 144 of the drive motor 40. They energize the motor in a first direction.

When the memory signal exceeds the actual speed signal, the output of the op amp 72 goes high. An NPN transistor amplifier 146 receives this output signal at its base and drives a pair of transistors 148 and 150 into conduction. The base of transistor 148 is connected to the emitter of transistor 146 through a resistor 152.

The switch 78, when closed, connects the reference input of the set latch, which takes the form of an operational amplifier 154, to ground through a resistor 156. The other input to the operational amplifier 154 is connected to its output through a diode 158. Accordingly, when the switch 78 is closed, a high voltage appears on the output of the op amp 154 and this voltage is retained even after the switch 78 is opened.

The output of the op amp 154 is applied to the base of an NPN transistor 160 through a resistor 162. A high voltage renders the transistor conductive. The solenoid coil 46 is disposed in series with the emitter-collector path of the transistor 160 across the battery. When the transistor 160 is conductive the solenoid 46 is energized. A diode 166 shunts the solenoid 46 to suppress transients.

Accordingly, when the operator uses the switch 28 to set a voltage into the memory he simultaneously energizes the solenoid. The solenoid remains energized until it is turned off in one of several ways. First, it may be turned off by a switch section 168 which forms the off section of the switch 28. This connects the circuit ground to the vehicle ground when it is closed and disables the entire circuit when it is open.

Secondly, the op amp 154 may be unlatched when brake switch 170 of the vehicle is closed. This switch connects the rear brake lights of the vehicle 172 across the battery. A diode 174 connects the light to the reference input of the op amp 154. When a positive voltage appears on this input the output goes low and stays low after the brake switch 170 is opened. This de-energizes the solenoid 46.

The solenoid 46 may also be deenergized by the underspeed protector which takes the form of an operational amplifier 176 that is connected in a comparator mode. The active input to the operational amplifier 76 comes from the mid-point of a resistor bridge consisting of resistors 178 and 180 which are connected across the battery. The reference input comes from the capacitor 114 which is charged to a voltage proportional to the engine speed. When the speed signal falls below the reference level, the output from the op amp 176 goes low. This signal is applied to the positive terminal of the op amp latch 154 through a diode 182 and causes the output of latch 154 to go low which shuts off transistor 160. Capacitor 184 connected between ground and the active terminal of the op amp 154 prevents transient spikes from opening the latch.

The up-speed switch 74 and down-speed switch 76 are ganged with a switch 155 which energized the reed relay 120.

The resume switch 32 shunts the set switch 78 and allows the latch to be reset without changing its speed representative voltage stored in memory.

A light emitting diode (LED) 185 is connected in series with a resistor 186 between the negative terminal of the battery and the reference input to the op amp 154, through the resistor 154. The LED is energized whenever a high output is present from the op amp 154 and is disposed in a position where it may be seen by the operator. When the switch 78 is momentarily closed the LED is extinguished and this signals the operator that the circuit is operating correctly.

One section of the positive power bus is connected to the positive terminal of the battery through the vehicle ignition switch 188, a reversal preventing diode 190, and a resistor 192. This portion of the circuit is disabled when the ignition switch is opened. Another portion of the circuit is permanently connected to the positive terminal of the battery through a reversal preventing diode 194. This section powers the resistor 160 but since the transistor is extinguished when the ignition switch is open, no power is applied to the motor drive or solenoid with the ignition switch open.

A voltage regulator consisting of a Zener diode 196 and a parallel capacitor 198 are connected across the battery section which is controlled by the ignition switch 188. This provides a regulated voltage which is independent of the power variations which might be produced when energizing the motor 144 or solenoid 46. The pivotable support of the motor 40 and its drive gear 44 prevents a system failure in the event that the accelerator pedal is fully depressed, and the cable 18 fully retracted on the reel 34, yet the vehicle speed is still less than the set speed so that the motor 40 is energized. This may occur when ascending a steep incline. In this event the resistance of the reel 34 to rotation causes the worm gear 44 to work its way off the end of the gear 38 so it may continue rotating without rotating the reel. When the motor 40 is later reversed so that the gear rotates in the opposite direction, it will again engage the gear 38.

The embodiments of the invention in which an exclusive property or privilege is claimed are defined as follows:

1. A speed control system for an automotive engine having an accelerator pedal connected to the engine and spring means for biasing the pedal toward a low speed setting, comprising: means connected to the engine for generating an electrical signal having a characteristic which is a function of the speed of the engine; means for storing said electrical signal; operator actuable switch means for momentarily connecting the electrical output of said means for generating an electrical signal having a characteristic which is a function of engine speed to said signal storage means; a comparator operative to receive said electrical signal having a characteristic which is a function of the speed of the engine and the output of said signal storage means and to provide an output signal having a characteristic which is a function of the relative level of its two inputs; and a drive system connected to the pedal and controlled by the output of the comparator.

2. The engine speed control system of claim 1 in which said means for generating an electrical signal having a characteristic which is a function of the engine speed includes means for generating electrical pulses of a constant duration at a rate proportional to the engine speed, and integrator means for receiving said pulses and generating a voltage proportional to the pulse frequency.

3. The engine speed control system of claim 2 wherein the engine includes an ignition system operative to provide firing signals to ignition apparatus in timed relation to the operation of the engine and said means for generating constant duration electrical pulses at a rate proportional to engine speed includes a fixed period, monostable multi-vibrator connected to receive said ignition signals so as to be triggered into conduction each time an ignition signal is received.

4. The engine speed control system of claim 1 in which said signal storage means includes a capacitor and a high input impedance amplifier operative to provide an output voltage proportional to the capacitor charge without diminishing the charge on the capacitor.

5. The engine speed control system of claim 1 in which said drive means is bi-directional and said comparator means comprises a pair of voltage comparators each connected to receive a signal having a characteristic which is a function of engine speed and the signal stored in the storage means, one operative to provide an output which powers the drive in the first direction when the signal having a characteristic which is a function of engine speed exceeds the signal stored in memory, and the other operative to provide an output which powers the drive in the opposite direction when the signal stored in memory exceeds the signal having a characteristic which is a function of engine speed.

6. The engine speed control system of claim 1 wherein said drive system includes a motor and a clutch and said operator actuated switch means for connecting the means for generating a signal having a characteristic which varies as a function of engine speed to the signal storage means also powers circuitry which engages said clutch.

7. The engine speed control system of claim 6 including means for disengaging said clutch when the engine speed falls below a predetermined value.

8. The engine speed control system of claim 6 wherein said engine provides the motor force for a vehicle having a braking system and further including circuitry connected to the braking system and the clutch operative to disengage the clutch at such time as the braking system is energized, whereby the drive system is disconnected from the vehicle speed control at such time as the brake is energized.

9. The speed control system of claim 6 including means for disengaging said clutch when the vehicle speed attains a predetermined value.

10. The engine speed control system of claim 1 including an operator actuable switch for applying power to said drive system for powering said drive system in either a first direction or a second direction and for applying the signal having a characteristic which varies as a function of the engine speed to the memory means while the drive system is being powered, whereby the operator may increase or decrease the vehicle speed to which the system is set.

11. A speed control system for a vehicle having an engine and an operator actuable accelerator pedal connected to the engine and biased toward movement in a direction to decrease the engine speed, comprising: an elongated flexible tension member having one end connected to the accelerator pedal so that when the tension member is pulled a force is exerted on the accelerator pedal urging it towards motion in a direction opposite to the bias; a rotatable drum having the other end of the tension member connected thereto; an electric drive motor for the drum; an electrically actuable clutch connected between the drive motor and the drum; an electric circuit connected to the engine and operative to generate an electrical signal having a value which varies with the engine speed; an operator actuable switch having an "on" position, an "off" position and a "set" position; and circuitry for receiving said electrical signal having a value representative of engine speed, and connected to said switch means, and being operative to control the application of electric power to the drive motor and to the clutch, whereby the vehicle operator may employ said switch means to maintain the engine speed at a pre-selected level.

12. The speed control system of claim 11 including a first gear connected to the output of the drive motor and a second gear connected to said drum and wherein said clutch means comprises a solenoid having a first position wherein said two gears are in engagement and a second position wherein said gears are out of engagement.

13. The speed control system of claim 11 wherein said circuitry operative to control the application of electric power to the drive motor and to the clutch includes a memory circuit and means for connecting the electrical signal having a value representative of engine speed to the memory circuit when the operator actuable switch is in a "set" postion so that the speed control system is thereafter set to maintain the engine speed at the value represented by the signal stored in the memory.

14. The speed control system of claim 11 wherein the drive motor is supported for pivotal motion relative to the drum and the clutch consists of an electrically actuated solenoid connected to the shaft of the drive motor to control the position of the drive motor relative to the drum.

15. The speed control system of claim 14 wherein a worm gear is supported on the shaft of the drive motor and a second gear is connected to the drum, and the worm gear and the second gear are moved into meshed relationship relative to one another when the solenoid is energized and are unmeshed relative to one another when the solenoid is deenergized.

* * * * *

UNITED STATES PATENT AND TRADEMARK OFFICE
CERTIFICATE OF CORRECTION

PATENT NO. : 4,132,284
DATED : January 2, 1979
INVENTOR(S) : Jerry J. Tomecek

It is certified that error appears in the above-identified patent and that said Letters Patent are hereby corrected as shown below:

Column 1, line 61 "relaed" should be --related--.

Column 9, line 23 "resistor" should be --transistor--.

Signed and Sealed this

Fifteenth Day of January 1980

[SEAL]

Attest:

SIDNEY A. DIAMOND

Attesting Officer

Commissioner of Patents and Trademarks